Feb. 16, 1932. A. ROSEWOOD 1,845,627
COMBINATION WATER FAUCET
Filed June 4, 1928 2 Sheets-Sheet 1
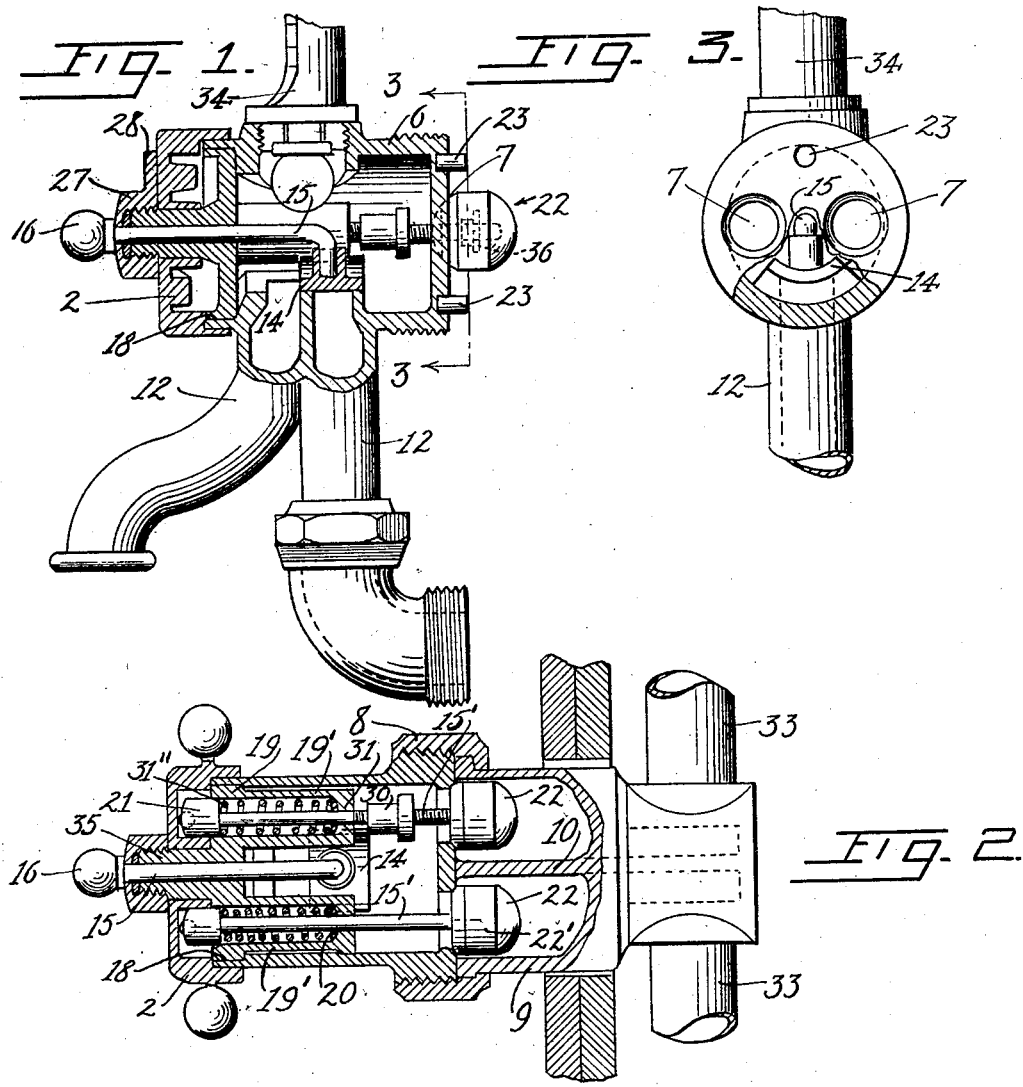
INVENTOR.
ALFRED ROSEWOOD
BY Munn & Co.
ATTORNEYS.

Feb. 16, 1932.  A. ROSEWOOD  1,845,627
COMBINATION WATER FAUCET
Filed June 4, 1928  2 Sheets-Sheet 2
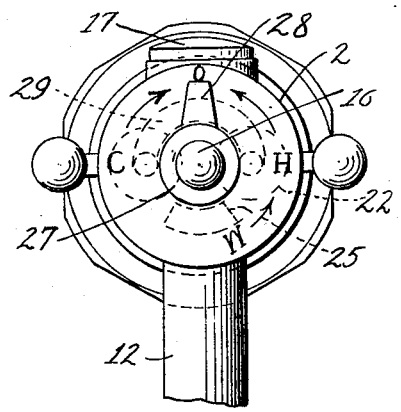
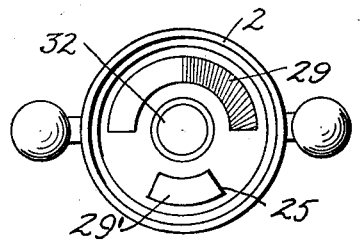
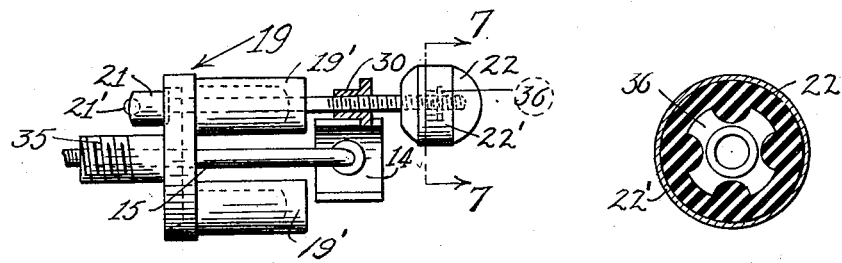
INVENTOR.
ALFRED ROSEWOOD
BY Munn & Co.
ATTORNEYS.

Patented Feb. 16, 1932

1,845,627

UNITED STATES PATENT OFFICE

ALFRED ROSEWOOD, OF SAN FRANCISCO, CALIFORNIA

COMBINATION WATER FAUCET

Application filed June 4, 1928. Serial No. 282,526.

The invention relates to improvements in faucets of the type which with one handle regulate the flow of either hot or cold water on a single unit faucet. The object of my invention is to provide a single unit faucet best adapted for bathroom use, a faucet that delivers the water to the bathtub, shower or sprinkler by mere manipulation of a cap to right or left for obtaining the desired temperature, and of a small central knob for dispensing the water directly into the bath tub or through a shower.

A further object of my invention is to dispense with several valves and their stems which perforate the tiled wall; to lessen the expense of installation and at the same time do away with the many conspicuous turning handles which decorate the wall of the modern bathroom.

It also provides a single unit faucet so constructed that the hot and cold water pipes join in the one faucet, simple in construction and neat in appearance, a faucet which is durable and reliable and cannot set up any disagreeable water-hammer vibration since its valves work automatically and cannot be injured or distorted by undue screwing or pulling as they have no positive connection with the operating handle and therefore will endure many years without renewing. There can also be a thermometer on the faucet when so desired.

I attain these objects by the novel construction and combination of the several parts, as will be shown in the drawings and pointed out in the claims.

The construction of my invention is illustrated in the accompanying drawings.

Figure 1 shows a vertical section of the faucet disconnected,

Figure 2 a horizontal section through the faucet showing the latter connected to a fixed member which in turn is connected with the water pipes, Figure 3 a rear view of the faucet, the valves being removed and a portion being shown in section, Figure 4 a front view of the faucet, Figure 5 an inside view of the operating cap, Figure 6 a plan view of a valve supporting unit forming part of my faucet, and Figure 7 a cross-section through the valve.

I prefer to construct my invention in the following manner:

The tubular casing 6 has one closed end into which two holes are drilled on a diametrical line on opposite sides of the center and which is threaded to receive a coupling ring 8. This coupling ring 8 is passed over a cylindrical casing 9 which is divided by a wall 10 and has its two conduits formed by the wall connected with the water pipes 33. It becomes a fixed member of the water system during the construction of the building. The holes 7 in the faucet are adapted to be closed by valves 22 which seat on the outside and become subjected to the water pressure when the two members are joined by screwing home the coupling ring 8. Two pegs 23 enter corresponding holes in the fixed member 9 and prevent accidental turning of the removable faucet.

In this particular faucet I provide two outlets 12 so arranged that either outlet may be closed or opened by a sliding valve 14 which is controlled by a central rod 15 provided with a knob 16 on its end.

Since it is often desirable to know the temperature of the outgoing water, provision is made for a thermometer 34 to be placed in the body of the faucet. If a thermometer is not desired it may be replaced by a cap plug 17 shown in Figure 4. No attempt is made to show the construction of the thermometer 34, provision only being made for it. The front end of the faucet terminates in an annular flange 18 adapted to receive a circular plate 19 having two perforations leading to two cylinders 19', the ends 31 of which serve as guides for the valve rods 15', while within the cylinders are accommodated helical springs 31'' which press on the packing 20 provided on the ends of the cylinders and on the valve stem heads 21 for seating the valves 22.

The round plate 19 is also provided with a central extension 35 with a hole drilled through it for the purpose of guiding the round rod 15 which is connected with the shut-off slide valve 14 regulating the flow of water either to the bathtub or the shower. The plate 19 is pressed into the main body of the faucet and soldered or otherwise secured. The valve stem heads 21 are preferably provided with steel balls 21' sunk thereinto.

The valves are formed of rubber and have a threaded brass eyelet 36 imbedded therein during their manufacture and are held from distortion by a metallic band 22' as described in my copending application Serial No. 275,784.

The front end of the faucet is closed by a cap 2 fitting on the flange 18, and the cap is provided, on its inner face, with a semi-circular cam 29 which is highest at the center and tapers toward the ends so as to merge with the inner cap surface. A second cam 29' forms a perpendicular stop at one end as at 25, and slopes downward toward the other end so as to merge into the cap surface. The cap has a hole 32 in its center to fit the central projection 35 of the plate 19. A packing gland 27 holds the cap to the faucet and is provided with an indicator 28 which is stationary with the faucet.

The operation of the fixture is as follows:
When the cap 2 is turned to the left, the cam exerts pressure on the steel ball of one of the valve heads, opening the hot water valve to its maximum limit. When the cap is turned still further, the cold water valve opens and the hot water temperature is lowered to any desired degree. On the hot water valve rod 15' is placed an auxiliary washer 30 by means of which the volume of the hot water may be modified as the cold water takes its place. This auxiliary washer 30 is located inside the main bore of the faucet, on the rod which controls the flow of hot water, and is threaded to the rod and can be regulated through the thermometer opening. The volume can also be regulated by the slide valve, particularly for the shower outlet.

When the cold water is desired, the cap is turned to the right and comes to a stop when the perpendicular face 25 of the small cam 29' meets the hot water valve head. The cap may form an adornment to the faucet and can be manufactured of china or porcelain, or any desired material in order to add to its appearance.

Although I have shown my invention herein as applying to bathtub and shower combined, it will readily be recognized that the invention may be employed separately as a mixing faucet or for sink and washstand use, by the elimination of the slide and one outlet.

I claim:

1. In a faucet of the character described, a housing having two endwise movable valves therein and a cap revolvable on the housing having a cam thereon shaped for operating one of the valves on a right hand turn and the other on a left hand turn.

2. In a faucet of the character described, a housing having two endwise movable valves therein and a cap revolvable on the housing having a cam thereon shaped for operating one of the valves on a right hand turn and the other on a left hand turn and having a second cam adapted to operate the second valve in addition to the first valve when the turning movement in one direction is continued.

3. In a faucet of the character described, a cylindrical housing, a single unit adapted for insertion into the housing having two valves slidable therein and a cap for the housing having means for operating either one of the valves.

4. In a faucet of the character described, a cylindrical housing, a single unit adapted for insertion into the housing having two valves slidable therein and a cap revolvable on the housing having means concealed therein for operating either one of the valves.

5. In a faucet of the character described, a cylindrical unit having two chambers adapted for connection to two water supply pipes, a cylindrical housing removably fastened to one end of the unit and having two valve openings leading to the two chambers respectively, valves for the openings carried by the housing and a cap revolvably fastened upon the end of the housing and having a cam on its inner face for actuating the valves.

In testimony whereof, I have hereunto set my hand at San Francisco, California, this 29th day of May, 1928.

ALFRED ROSEWOOD.